R. H. ROGERS.
METHOD OF AND MEANS FOR REGULATING THE SPEED OF ELECTRIC MOTORS.
APPLICATION FILED AUG. 5, 1908.
942,463.
Patented Dec. 7, 1909.
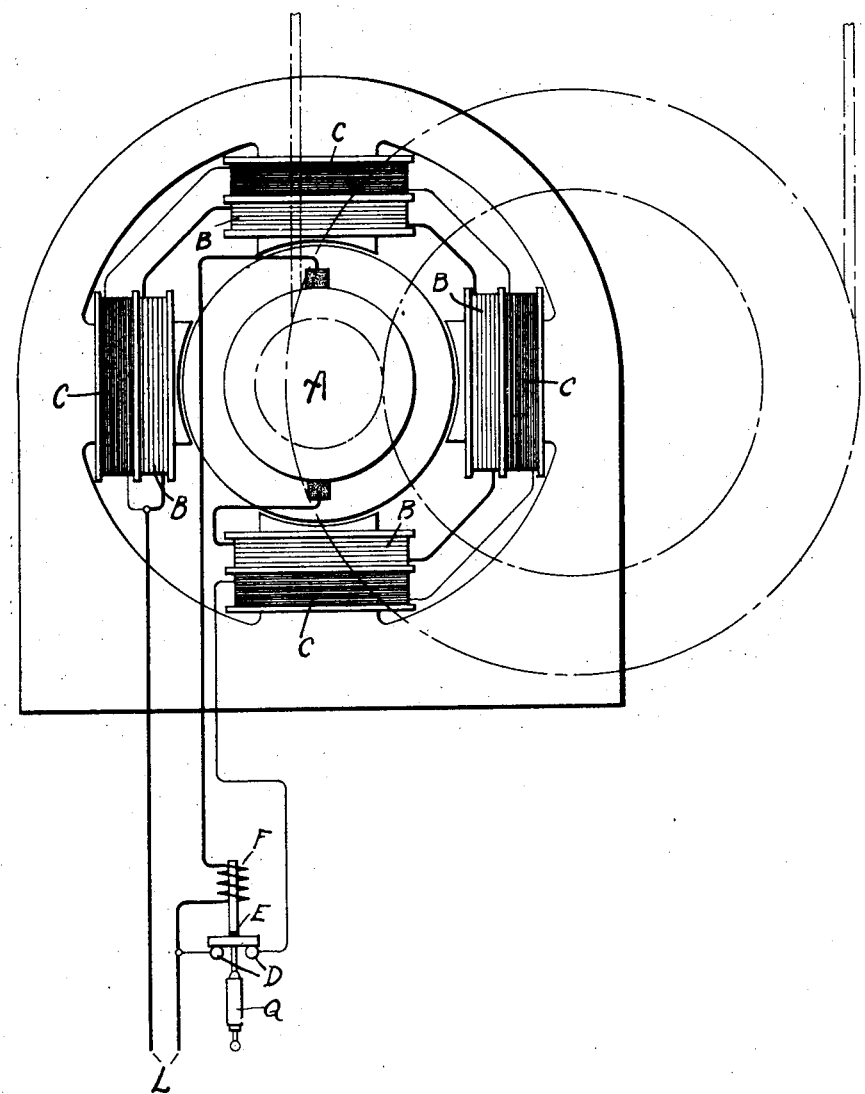
Witnesses:
Lloyd C. Bush
Inventor:
Robert H. Rogers,
By
Atty.

UNITED STATES PATENT OFFICE.

ROBERT H. ROGERS, OF SCHENECTADY, NEW YORK, ASSIGNOR TO GENERAL ELECTRIC COMPANY, A CORPORATION OF NEW YORK.

METHOD OF AND MEANS FOR REGULATING THE SPEED OF ELECTRIC MOTORS.

942,463.

Specification of Letters Patent.   Patented Dec. 7, 1909.

Application filed August 5, 1908.   Serial No. 447,065.

*To all whom it may concern:*

Be it known that I, ROBERT H. ROGERS, a citizen of the United States, residing at Schenectady, in the county of Schenectady and State of New York, have invented certain new and useful Improvements in Methods of and Means for Regulating the Speed of Electric Motors, of which the following is a specification.

My invention relates to electric motors and more particularly to a method of and means for regulating the speed of such motors.

It is well known that series motors of the direct current type will tend to "race" when lightly loaded. Heretofore, when such motors have been used under conditions in which their load is likely to be suddenly thrown off or greatly reduced, means such as underload relays, have been provided to open the motor circuit. If the motor is the trolley motor on a crane, the load is often reduced to a very small amount by the swinging of the load in the direction of its travel, and upon the opening of the motor circuit, the craneman must descend from the crane in order to again close it. This is very inconvenient and causes great loss of time. To avoid this difficulty, I provide the motor with two field windings, and regulate its speed by operating the motor as a series motor when heavily loaded and as a cumulative compound motor when lightly loaded.

In another aspect, my invention consists in the combination with an electric motor having two field windings wound cumulatively, of means for maintaining the circuit of one of said windings open when the motor is heavily loaded and for closing said circuit when the motor is lightly loaded.

In a still narrower aspect my invention consists in the combination of a series motor having a cumulative shunt field winding, of means actuated by the current supplied to the armature of said motor for maintaining the circuit of the shunt field winding open when a large amount of current is supplied and for closing said circuit when a small amount of current is supplied.

For a better understanding of my invention, reference may be had to the following description taken in connection with the accompanying drawing which shows diagrammatically the arrangement of the connections of a motor according to my invention.

Referring to the diagram, in order to prevent the motor A from racing when operating under a light load, I provide two field windings B and C wound cumulatively, one of which remains open at the contacts D when the motor is heavily loaded but when the motor is lightly loaded the circuit of this field winding C is closed. The field winding B is supplied with current from the lines L in series with the armature of the motor. The field winding C is a shunt winding, which may be connected across the lines L. As pointed out above, the circuit of this winding may be made and broken at the contacts D of the relay E. The actuating coil F of this relay is also in series with the armature of the motor. This relay is arranged to lift up its armature and keep the circuit across the contacts D open when a heavy current flows through its actuating coil and to close the circuit across its contacts when very little current flows through its actuating coil, either by the action of gravity as shown, or by any other suitable means. The relay is provided with a dash-pot Q to retard its action upon the opening of its contacts so as to break the circuit of the shunt field winding C slowly. It will therefore be seen that when the machine A is carrying a load, a comparatively large current flows through the lines L, the series field B, the motor armature and the actuating coil F of the relay. The large current flowing through the coil F maintains the circuit across the contacts D open so that no current is supplied to the field winding C, and the motor A operates as a series motor. In case, however, the load is taken off the motor because of the swinging of the bucket or for any other cause the current taken by the motor is greatly reduced and it tends to "race", because of the weakened field. The reduction of the current supplied to the motor, however, lessens the amount flowing through the coil F, it releases its armature and the circuit is closed across the contacts D, thereby supplying excitation to the field winding C. This winding being wound cumulatively, that is, wound so that it produces a magnetic field in the same direction as the series field winding B, adds to the field of the motor and slows it down, the motor then operating as a cumulative compound motor.

I have described my invention in connection with the trolley motor on a crane to which it is particularly adapted, but I do not wish to be limited thereto, as it is evident to those skilled in the art, that it may be used in connection with motors driving hoists or other apparatus, or with dynamo electric machines generally as, for example, with machines which ordinarily run as generators, but under certain conditions may operate as motors, and I aim in the appended claims to cover all such applications of my invention.

What I claim as new and desire to secure by Letters Patent of the United States, is,

1. The method of regulating the speed of an electric motor having two field windings wound cumulatively, which consists in maintaining one of said field circuits open when the motor is heavily loaded and closing said field circuit when said motor is lightly loaded.

2. The method of regulating the speed of a series motor having a cumulative shunt field winding, which consists in maintaining said shunt field winding open when the motor is heavily loaded and closing said shunt field circuit when said motor is lightly loaded.

3. The method of regulating the speed of an electric motor having a shunt and series field winding, which consists in operating said motor as a series motor when under load and as a cumulative compound motor when lightly loaded.

4. In combination with an electric motor having two field windings wound cumulatively, means for maintaining the circuit of one of said windings open when the motor is heavily loaded and for closing said circuit when the motor is lightly loaded.

5. In combination with an electric motor having two field windings wound cumulatively, means actuated by the current supplied the armature of said motor for maintaining the circuit of one of said windings open when a large amount of current is supplied and for closing said circuit when a small amount of current is supplied.

6. In combination with an electric motor having two field windings wound cumulatively, a relay actuated by the current supplied the armature of said motor for maintaining the circuit of one of said windings open when a large amount of current is supplied and for closing said circuit when a small amount of current is supplied.

7. In combination with a series motor having a cumulative shunt field winding, means for maintaining the circuit of said shunt field winding open when the motor is heavily loaded and for closing said circuit when the motor is lightly loaded.

8. In combination with a series motor having a cumulative shunt field winding, means actuated by the current supplied the armature of said motor for maintaining the shunt field winding circuit open when a large amount of current is supplied and for closing said circuit when a small amount of current is supplied.

9. In combination with a series motor having a cumulative shunt field winding, a relay actuated by the current supplied the armature of said motor for maintaining the shunt field winding circuit open when a large amount of current is supplied and for closing said circuit when a small amount of current is supplied.

10. In combination with a series motor having a cumulative shunt field winding, a relay for maintaining the circuit of said shunt field winding open when the motor is heavily loaded and for closing said circuit when the motor is lightly loaded.

In witness whereof, I have hereunto set my hand this 4th day of August, 1908.

ROBERT H. ROGERS.

Witnesses:
BENJAMIN B. HULL,
HELEN ORFORD.